US006989762B2

(12) United States Patent
Fraenkel et al.

(10) Patent No.: US 6,989,762 B2
(45) Date of Patent: Jan. 24, 2006

(54) PROXIMITY-BASED AUTOMATIC ID CODE RECONFIGURATION OF WIRELESS INPUT/OUTPUT SYSTEMS

(75) Inventors: Cris Fraenkel, North Vancouver (CA); John Cavacuiti, North Vancouver (CA)

(73) Assignee: Acco Brands, Inc., Lincolnshire, IL (US)

( * ) Notice: Subject to any disclaimer, the term of this patent is extended or adjusted under 35 U.S.C. 154(b) by 0 days.

(21) Appl. No.: 10/278,749

(22) Filed: Oct. 23, 2002

(65) Prior Publication Data

US 2004/0080426 A1 Apr. 29, 2004

(51) Int. Cl.
*H04Q 5/22* (2006.01)
*G05B 19/00* (2006.01)

(52) U.S. Cl. ................................ 340/825.52; 340/10.5; 340/10.51; 340/10.52

(58) Field of Classification Search ............ 340/825.52, 340/825.69, 825.72, 10.1, 10.5, 10.51, 10.52, 340/5.72, 10.2, 5.2, 5.22, 5.23, 5.25; 455/423, 455/522

See application file for complete search history.

(56) References Cited

U.S. PATENT DOCUMENTS 4,686,529 A * 8/1987 Kleefeldt ............... 340/825.72
5,365,225 A * 11/1994 Bachhuber ............. 340/825.72
5,602,535 A * 2/1997 Boyles et al. .............. 340/5.22
6,549,119 B1 * 4/2003 Turner ........................ 340/10.5
6,617,961 B1 * 9/2003 Janssen et al. ......... 340/825.72
6,718,240 B1 * 4/2004 Suda et al. ................ 340/5.72
2002/0016153 A1 * 2/2002 Sato et al. ..................... 455/41
2003/0003905 A1 * 1/2003 Shvodian .................... 455/423
2003/0071927 A1 * 4/2003 Park et al. ............. 340/825.52
2003/0080850 A1 * 5/2003 Kline ......................... 340/5.6
2003/0220765 A1 * 11/2003 Overy et al. ................ 702/158

* cited by examiner

*Primary Examiner*—Brian Zimmerman
*Assistant Examiner*—Clara Yang
(74) *Attorney, Agent, or Firm*—Townsend and Townsend and Crew LLP

(57) ABSTRACT

A system and method is disclosed for reconfiguring an ID code associated with a receiver to enable a receiver to respond to data packets tagged with the ID code sent from a desired transmitter. The system includes a transmitter, selectively responsive to an enable command, for broadcasting a data packet at a first power level when the enable command is asserted, the data packet including an ID code, the transmitter broadcasting an ID configuration command having a configuration ID code at a second power level less than the first power level when the enable signal is deasserted.

18 Claims, 3 Drawing Sheets

PROXIMITY-BASED AUTOMATIC ID CODE RECONFIGURATION OF WIRELESS INPUT/OUTPUT SYSTEMS

BACKGROUND

The present invention relates generally to wireless input/output (I/O) systems for computer systems, and more specifically to reconfiguring an ID code associated with a receiver to enable a receiver to respond to data packets tagged with the ID code sent from a desired transmitter.

Wireless input/output systems have proliferated over the last few years. The systems typically include a transmitter associated with a device, such as a keyboard or mouse. A receiver is coupled to the appropriate I/O port on a computer system, and the device communicates to the computer system by broadcasting data signals from the transmitter to the receiver. This solution is simple and efficient, yet has problems when multiple devices are used on one or more computer systems.

Wireless I/O solutions developed a solution to this problem of associating data packets sent from each transmitter with a unique ID code. A receiver that was to operate with a particular transmitter would be matched by associating the receiver with the same ID code. The receiver would accept only those data packets having the associated ID code and reject all other data packets.

The solution was effective, but introduced yet another complication in that users wanted to be able to use a device on different computer systems or otherwise change the interrelationship between various device(s) and the one or more computer systems. The solution that was developed was to provide each receiver with a reconfiguration button. When activated, the reconfiguration button would put the receiver into a reconfiguration mode and a subsequent transmission from a transmitter with a particular ID would cause the receiver to associate itself with the newly transmitted ID code embedded in the data packet. The solution did not require a change to the transmitter data packets or use of different transmitted information.

One disadvantage to these solutions is that it is not always readily apparent to a user which transmitter it is associating with the receiver. Additionally, the reconfiguration buttons can at times be small and hard to access/activate, making the reconfiguration of the receiver inconvenient at times.

SUMMARY OF THE INVENTION

A system and method is disclosed for reconfiguring an ID code associated with a receiver to enable a receiver to respond to data packets tagged with the ID code sent from a desired transmitter. A preferred embodiment includes a transmitter for broadcasting a data packet at a first power level, the data packet including an ID code, the transmitter broadcasting an ID configuration command having a configuration ID code at a second power level less than the first power level. A receiver in range of the ID configuration command adopts the configuration ID as the ID code to use to qualify tagged data packets, which may be different from the ID code that the receiver used previously. When the receiver changes ID codes, the receiver is reconfigured.

The preferred embodiment of a method for operating a transmitter includes the steps of broadcasting a data packet at a first power level when an enable signal is asserted, the data packet including an ID code; and broadcasting an ID configuration command at a second power level less than the first power level when the enable signal is deasserted, the ID configuration command including a configuration ID code.

The transmitter and system of the preferred embodiment simply and efficiently permit a user to unambiguously and simply reconfigure a wireless receiver to work with a transmitter of the user's choice. In the case that there are several transmitters and receivers each operating in a limited space, all within the normal operational distance of the transmitters, a user may unambiguously, simply and efficiently configure a receiver to work with a particular transmitter by just moving the desired receiver and transmitter close enough together to touch or practically touch depending upon the desired application.

The novel features which are characteristic of the invention, as to organization and method of operation, together with further objects and advantages thereof, will be better understood from the following description considered in connection with the accompanying drawings in which one or more preferred embodiments of the invention are illustrated by way of example. It is to be expressly understood, however, that the drawings are for the purpose of illustration and description only and are not intended as a definition of the limits of the invention. These drawings include the following figures, with like numerals indicating like parts.

DETAILED DESCRIPTION

The present invention relates to wireless input/output (I/O) systems for computer systems, and more specifically to reconfiguring an ID code associated with a receiver to enable a receiver to respond to data packets tagged with the ID code sent from a desired transmitter. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
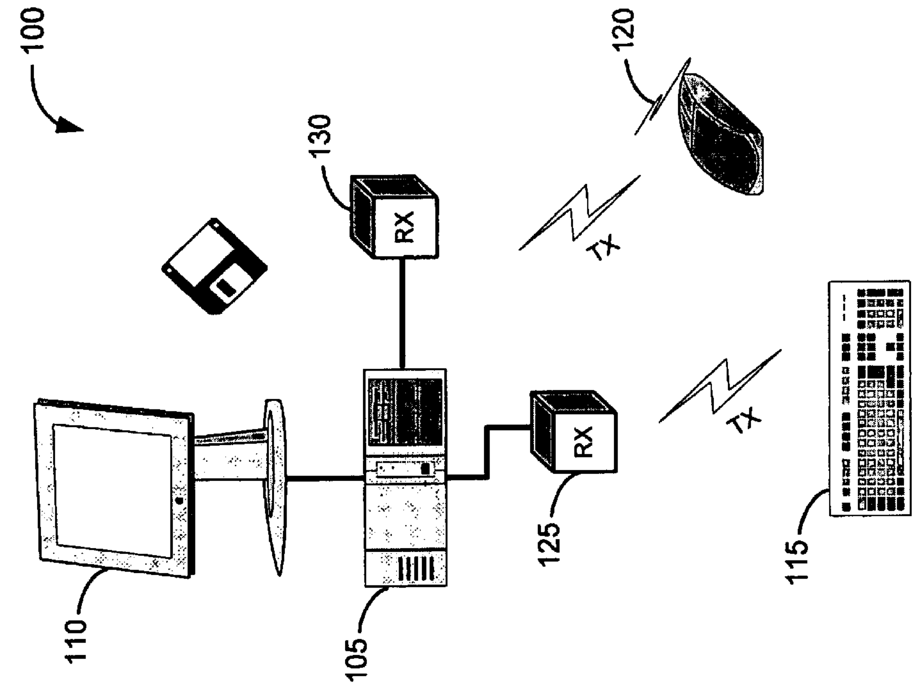
FIG. 1 is a schematic block diagram of an application for the preferred embodiment.
Figure 1:
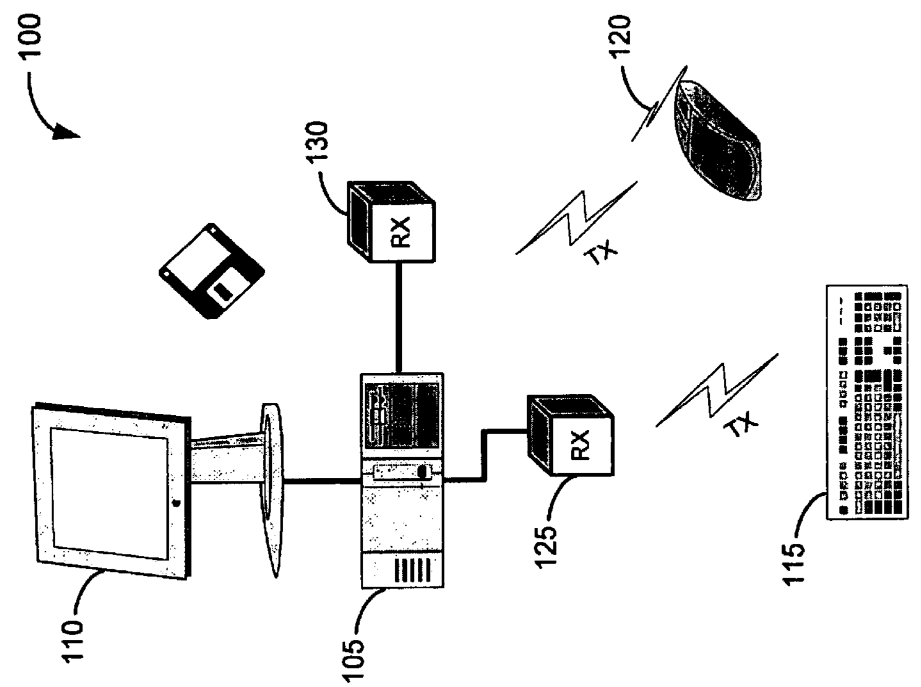

FIG. 1 is a schematic block diagram of a system 100 of the preferred embodiment. Each system 100 includes a processing unit 105, a monitor 110, a wireless keyboard 115, a wireless pointing device (e.g., mouse) 120, and two receivers (a keyboard receiver 125 and a mouse receiver 130). System 100 operates much like a conventional computing system with processing unit 105 including conventional central processing unit (CPU), memory (both volatile and non-volatile including hard drives, floppy drives, etc., for example) and input/output systems for interfacing to monitor 110, keyboard 115 and pointing device 120 in well-known fashion. The present invention addresses configuring keyboard receiver 125 to work with keyboard 115 and mouse receiver 130 to work with pointing device 120, for each system 100.

Keyboard 115 and pointing device 120 both include radiofrequency (RF) transmitters though other wireless transmissions systems (e.g., IR systems or acoustic systems) could be employed with the invention. To unambiguously communicate with their respective devices, keyboard 115 and pointing device 120 each broadcast data packets tagged with a unique ID code. This code is also preferably a ten-bit ID code. Each receiver includes, in the preferred embodiment, a non-volatile memory for associating an ID code with the receiver. This non-volatile memory is preferably a writeable memory, such as NVRAM or EEPROM and includes a ten-bit ID code that corresponds to the ID code in the transmitter. That is, the ID code in keyboard receiver 125 corresponds to the ID code tagged to data packets transmitted from wireless keyboard 115. Similarly, the ID code in mouse receiver 130 corresponds to the ID code tagged to data packets transmitted from pointing device 120. Each system 100, in the preferred embodiment, has unique ID codes for each receiver, keyboard, mouse or other. Correspondence for purposes of the present application means that the ID codes are related to each other to enable the receiver to process the tagged data packet. In the preferred embodiment, correspondence is achieved upon matching the ID code of a transmitted data packet to the stored ID code of the receiver. In other embodiments, the ID codes may be supersets or subsets of one other, or have other defined relationships.

The corresponding receiver does not reject data packets that are transmitted with a corresponding ID code. As long as data transactions are occurring, transmitters and receivers continue to decode and act upon properly tagged data packets, while rejecting the others. Thus a user of one system 100 could use both keyboard 115 and pointing device 120 at the same time and at the same time that another user of another computer system 100 is using both keyboard 115 and pointing device 120, as the corresponding receivers will reject data packets from the other wireless device. This is true for additional receivers in the same or additional systems.

The transmitters in the wireless devices (e.g., wireless keyboard 115 and wireless pointing device 120) of the preferred embodiment also include a second operational mode: a receiver reconfiguration mode. In this mode, the transmitters will issue an ID code reconfiguration command at a reduced power level. Any receiver in range of the transmitter sending this reconfiguration command has the associated ID code stored in the respective nonvolatile memory rewritten to the commanded ID code. In the preferred embodiment, the transmitter modes are discrete, with the transmitter in one mode or the other at any time. In some applications, it may be that the transmitter modes overlap for all or a portion of the time.

In the preferred embodiment, the ID code reconfiguration command includes a transmission of fifteen reconfiguration signals, along with a configuration ID code. Any receiver picking up ten or more of the reconfiguration signals is caused to associate itself with the newly transmitted ID code. In other embodiments, a reconfiguration command may not transmit directly a configuration ID code for the receiver to use. Rather, it may cause the receiver to write a new predetermined, or determinable, value to the nonvolatile memory. For example, the reconfiguration command may cause the old ID value to be incremented or decremented by one and used as the new associated ID code for the receiver. In other embodiments, the ID code reconfiguration command may be a single signal or other specially recognized message to the receiver.

In the preferred embodiment, each transmitter has an associated ID code, and it is this ID code that is used in the ID reconfiguration command. The associated ID code is typically permanently set in the transmitter, but in some applications it may be desirable to have the user associate a new ID code with a transmitter. Such as where multiple transmitters attempt to use the same ID code. In other instances, a transmitter may automatically detect the use of the same ID code by another transmitter and reconfigure itself to use another ID code.

If the wireless device becomes active during the reconfiguration command, the reconfiguration is aborted until data transactions between the transmitter and receiver are complete. Thereafter, transmitters may attempt to retransmit the reconfiguration command if reconfiguration is still desired.

In the preferred embodiment, the reduced power level of the transmitters is set to be detectable from receivers placed within a six to twelve inch radius of the transmitter. In contrast, the normal, full power operation of the wireless transmitters makes the data packets detectable at about six to nine feet from a transmitter. In the preferred embodiment, the low power mode transmission is about 62 decibels down from the full power mode.

Figure 2:
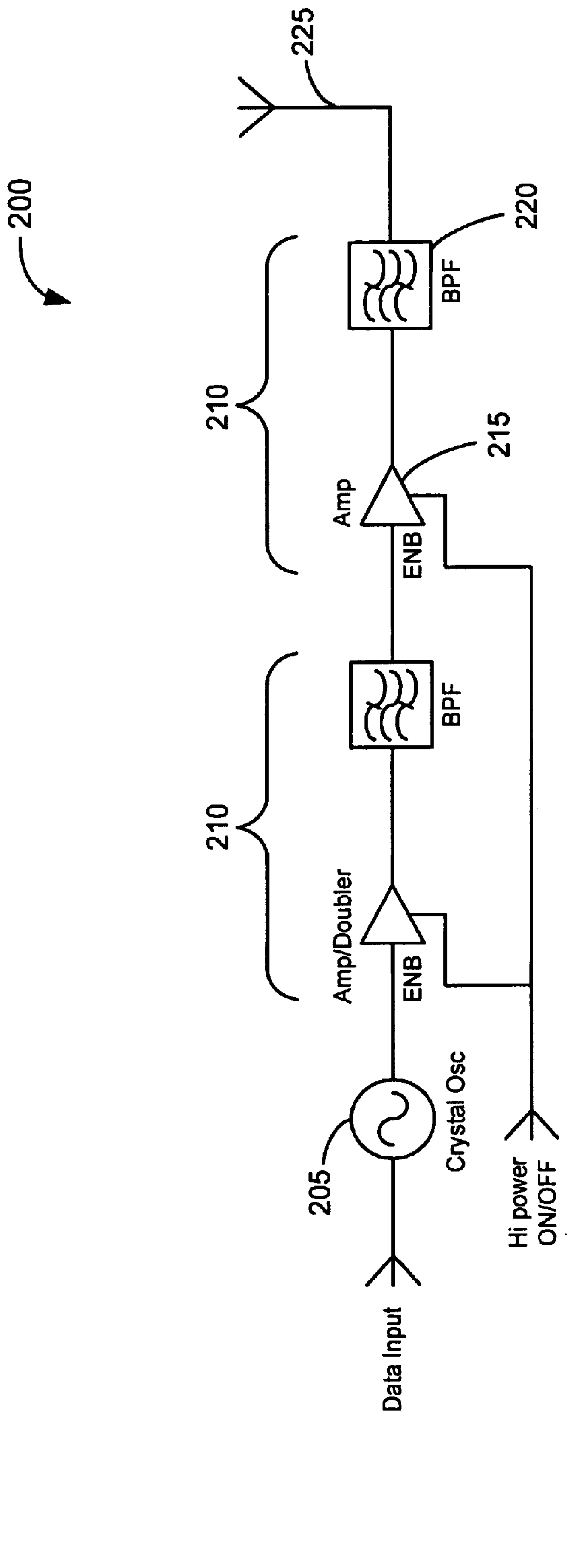
FIG. 2 is a schematic block diagram for a transmitter according to the preferred embodiment.

FIG. 2 is a schematic block diagram for a transmitter block 200 according to the preferred embodiment. Transmitter block 200 includes a crystal oscillator 205 driven by data present at a data input. Output from oscillator 205 is amplified and processed through a serial succession of output stages 210. Each output stage 210 includes an amplifier 215 and a bandpass filter 220, with an output of a final stage coupled to an antenna 225. Each output stage 210 (particularly the active component amplifier 215 of each stage) is responsive to a high power enable signal. Assertion of the enable signal activates the output stages, while deassertion of the high power enable signal deactivates the output stages.

When the high power enable signal is asserted, each output stage 210 is enabled and transmitter block 200 broadcasts data packets at full power. As discussed above, the preferred reception range is about six to nine feet. When the high power enable signal is deasserted, the output stages are disabled with oscillator 205 operational. Oscillator 205, in cooperation with other components and PCB traces, is sufficient to broadcast at low power to a range of about six to twelve inches. Oscillator 205 is functionally disconnected from antenna 225 and broadcasts without amplification.

Figure 3:
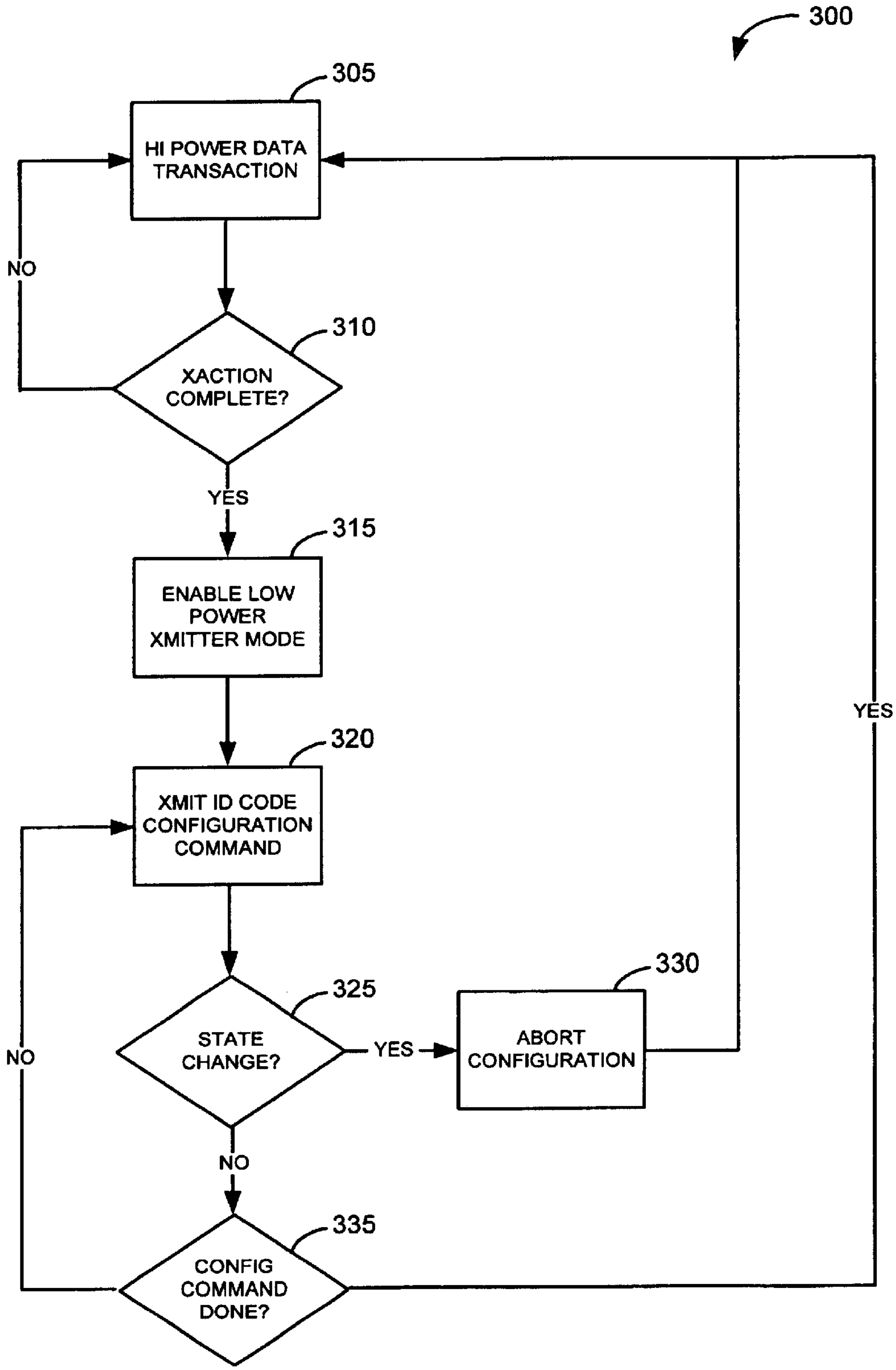
FIG. 3 is a flowchart of the preferred embodiment for a transmitter method in an ID code reconfiguration process for wireless devices.

FIG. 3 is a flowchart of the preferred embodiment for transmitter method 300 in an ID code reconfiguration process for a wireless system such as shown in FIG. 1. Process 300 starts at a high power data transaction step 305. A data transaction of the preferred embodiment is when a receiver and a transmitter are in communication and exchanging data, and in which transmitter block 200 of FIG. 200 is operating at full power. Process 300 periodically tests, at step 310, whether the data transaction is complete. If it is not, process 300 loops back to step 305 for process 300 to loop through steps 305 and 310 until step 310 tests that the data transaction is complete. When complete, process 300 advances to step 315 from step 310 to enable the low power mode of transmitter block 200. Process 300 next, at step 320, transmits the ID code configuration command in low power mode. Process 300 tests whether there is a state change in the wireless device/transmitter at step 325. If so, process 300 branches to step 330 to abort the reconfiguration command and return to step 305 to begin a data transaction. If instead at test step 325 there is no state change, process 300 tests at step 335 whether the ID code reconfiguration command is complete. If not, process 300 cycles through step 320, step 325 and step 335 until step 335 determines that the ID code reconfiguration command has been completely transmitted. When done, process 300 returns to step 305 from step 335 to begin a high power data transaction or to send another ID code configuration command, as appropriate.

From a user's perspective, reconfiguration of an ID code of a receiver is a matter of positioning a transmitter close (i.e., within the low power range) to a receiver, and operating the wireless device associated with the transmitter. Thereafter the receiver will have its ID code updated automatically.

Although the present invention has been described in accordance with the embodiments shown, one of ordinary skill in the art will readily recognize that there could be variations to the embodiments and those variations would be within the spirit and scope of the present invention. For example, the preferred embodiment has been implemented between a transmitter and a receiver. In some applications, the present invention is applicable to pairs of transceivers that exchange configuration information (e.g., enumeration and interrogation commands such as used in Bluetooth systems). By appropriately and consistently reducing an effective range for certain of the configuration signals, transceiving systems could be used to configure devices that are 'closer' together than the full operational range of the devices. For many devices used in close quarters, the invention makes it easier for a user to appropriately configure the devices with the appropriate computing system. In these close quarters, it may be that a user does not have access to a transmitter/receiver/transceiver or its associated system to respond to inappropriate configuration signals directed to other, undesired, systems.

Additionally, the preferred embodiment employs an enable signal to configure a transmitter to selectively send the ID configuration signal with a configuration ID code. In some applications, it may be appropriate to continuously send configuration ID codes, which may be interspersed with data packets. For example, a transmitter may be in an operational mode, a configuration mode, or a combination of the two at any particular time, depending upon the application.

Further, the preferred embodiment provides that the receiver be configured/reconfigured responsive to an ID configuration signal and that the receiver be used to discriminate data packets with mismatching ID codes. Only valid data packets with appropriate ID code tags are sent to the associated computing system. In some applications, it may be preferable to have the receiver pass ID configuration signals and all valid data packets to the associated computing system to have the operating system or a software/hardware/firmware driver operating with the receiver be appropriately configured and/or perform the necessary discrimination.

Additionally, in the preferred embodiment, the receiver have a single has a single valid ID code at any time. A receiver in range of a transmitter when the transmitter issues the configuration change signal uses the configuration ID code included in the transmitter ID configuration signal. In other applications, it may be desirable to have a receiver have capacity to accept multiple ID codes, and any configuration ID code that is received that does not match any current ID code associated with the receiver will be additionally written rather than being replaced in the receiver.

Accordingly, many modifications may be made by one of ordinary skill in the art without departing from the spirit and scope of the appended claims.

What is claimed is:

1. An apparatus, comprising:

a transmitter for broadcasting a data packet at a first power level, said data packet including an ID code, said transmitter broadcasting an ID configuration command having a configuration ID code at a second power level less than said first power level, wherein a receiver is automatically configured with the configuration ID code when the transmitter is within a range such that the receiver receives the ID configuration command broadcasted at the second power level.

2. The apparatus of claim 1 wherein the transmitter is selectively responsive to an enable command, and wherein the transmitter broadcasts said ID configuration command when said enable command is asserted.

3. The apparatus of claim 1 wherein said transmitter broadcasts over a wireless communication channel.

4. A system, comprising:

a transmitter for broadcasting a data packet at a first power level, said data packet including an ID code, said transmitter broadcasting an ID configuration command including a configuration ID code at a second power level less than said first power level; and a receiver, in communication with said transmitter and having an associated ID code, said receiver accepting said data packet when said ID code corresponds to said associated ID code and rejecting said data packet when said ID code does not correspond to said associated ID code, said receiver automatically reassociating with said configuration ID code when the transmitter is within a range such that the receiver receives said ID configuration command broadcasted at the second power level.

5. A system, comprising:

a transmitter for broadcasting a data packet at a first power level, said data packet including an ID code, said transmitter broadcasting an ID configuration command having a configuration ID code at a second power level less than said first power level; and a computing system, in wireless communication with said transmitter through a receiver, said computing system having an associated ID code, said computing system accepting said data packet when said ID code corresponds to said associated ID code and rejecting said data packet when said ID code does not correspond to said associated ID code, said computer system automatically reassociating with said configuration ID code when the transmitter is within a range such that the receiver receives said ID configuration command broadcasted at the second power level.

6. The system of claim 5 wherein said reassociating is done using said receiver.

7. The system of claim 5 wherein said reassociating is done using a component of the computing system other than said receiver.

8. The system of claim 5 wherein said correspondence between said ID code and said associated ID code is satisfied when said ID codes match each other.

9. The system of claim 5 wherein said receiver includes a non-volatile memory for storing said associated ID code and wherein said configuration ID code is stored in said non-volatile memory upon reassociating said configuration ID code.

10. A method for operating a transmitter, comprising the steps of:

broadcasting a data packet at a first power level, said data packet including an ID code; and broadcasting an ID configuration command at a second power level less than said first power level, said ID configuration command including a configuration ID code, wherein a receiver is automatically configured with the configuration ID code when the transmitter is within a range such that the receiver receives the ID configuration command broadcasted at the second power level.

11. A reconfiguration method for a receiver, comprising the steps of:

broadcasting, from a transmitter, a data packet at a first power level from a transmitter when an enable signal is asserted, said data packet including an ID code;

broadcasting, from a transmitter, an ID configuration command at a second power level less than said first power level from said transmitter when said enable signal is deasserted, said ID configuration command including a configuration ID code.

accepting said data packet at the receiver when said ID code corresponds to an associated ID code of the receiver;

rejecting said data packet at the receiver when said ID code does not correspond to said associated ID code; and automatically configuring the receiver with said configuration ID code when receiving said ID configuration command when the transmitter is within a range such that the receiver receives the ID configuration command broadcasted at the second power level.

12. A method of configuring a receiver from a transmitter, comprising the step of:

decreasing a separation distance between the receiver and the transmitter so that the receiver and the transmitter are within a configuration distance that is less than an operational distance wherein the receiver responds to a configuration command transmitted at a reduced power than an operational command from the transmitter only when said separation distance is not greater than said configuration distance, wherein the receiver is automatically configured with the configuration command when the transmitter is moved within the configuration distance.

13. A method of configuring a receiver from a transmitter, comprising the steps of:

receiving a configuration signal from the transmitter at a first power, said configuration signal receivable within a configuration distance that is less than an operational distance of the transmitter so that the receiver within said operational distance but beyond said configuration distance receives data at a second power greater than the first power from said transmitter but does not configure itself responsive to said configuration signal; and automatically configuring the receiver according to said configuration signal only when the transmitter is within said configuration distance from the receiver.

14. A method of configuring a wireless receiver from a transmitter, comprising the step of:

decreasing a separation distance between the transmitter and the receiver to enable the receiver to receive a reduced power configuration signal broadcast from the transmitter, said configuration signal broadcast with a lesser effective range than other data transmission broadcasts from the transmitter, wherein the receiver is automatically configured with the configuration signal when the transmitter is moved within the configuration distance.

15. A data transmission system, comprising:

a proximity-based configuring receiver for operating in cooperation with a transmitter, said receiver configuring itself responsive to information from said transmitter only when said receiver is within a configuration distance from said transmitter with said configuration distance less than an operational distance between said receiver and said transmitter, wherein the information at the configuration distance from the said transmitter is transmitted at a lower power than information transmitted at the operational distance, wherein the receiver is automatically configured with the information from said transmitter when the transmitter is moved within the configuration distance.

16. A system, comprising:

a transmitter for broadcasting a data packet tagged with a broadcast identifier and for broadcasting a receiver identifier configuration control; and a receiver in communication with said transmitter and having a receiver identifier, said receiver operational to receive said data packet when said receiver identifier to said broadcast identifier and said receiver is within a first distance from said transmitter, said receiver operational to reconfigure said receiver identifier in response to said receiver identifier configuration control only when said receiver is within a second distance from said transmitter, said second distance less than said first distance, wherein the receiver is automatically configured with the receiver identifier when the transmitter is moved within the configuration distance such that the receiver receives the receiver identifier configuration control.

17. The system of claim 16 wherein said receiver identifier configuration control includes a configuration ID and said receiver overwrites a nonvolatile memory of said receiver with said configuration ID responsive to receipt of said receiver identifier configuration control.

18. The system of claim 16 wherein said receiver identifier configuration control includes a configuration ID and said receiver writes a nonvolatile memory of said receiver with said configuration ID responsive to receipt of said receiver identifier configuration control wherein said configuration ID is added to said memory with another ID code previously stored in said memory.

* * * * *

UNITED STATES PATENT AND TRADEMARK OFFICE

CERTIFICATE OF CORRECTION

PATENT NO. : 6,989,762 B2 Page 1 of 1
APPLICATION NO. : 10/278749
DATED : January 24, 2006
INVENTOR(S) : Fraenkel et al.

It is certified that error appears in the above-identified patent and that said Letters Patent is hereby corrected as shown below:

<u>On the cover sheet, under paragraph (73):</u>

Delete "Acco Brands, Inc." and replace it with:

--Acco Brands USA LLC.--

<u>In Claim 11, column 7, line 18:</u>

Delete "code." and replace it with --code;--

Signed and Sealed this

Eighteenth Day of July, 2006

JON W. DUDAS
*Director of the United States Patent and Trademark Office*